(12) United States Patent
Tichy et al.

(10) Patent No.: US 11,456,472 B2
(45) Date of Patent: Sep. 27, 2022

(54) METHOD AND DEVICE FOR GENERATING ELECTRIC ENERGY

(71) Applicant: DIEHL AEROSPACE GMBH, Ueberlingen (DE)

(72) Inventors: Franz Tichy, Eppertshausen (DE);
Bernd Speth, Ueberlingen (DE);
Eduard Harwardt, Stadtallendorf (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 235 days.

(21) Appl. No.: 16/483,059

(22) PCT Filed: Jan. 17, 2018

(86) PCT No.: PCT/EP2018/000023
§ 371 (c)(1),
(2) Date: Aug. 2, 2019

(87) PCT Pub. No.: WO2018/141470
PCT Pub. Date: Aug. 9, 2018

(65) Prior Publication Data
US 2020/0014044 A1  Jan. 9, 2020

(30) Foreign Application Priority Data
Feb. 4, 2017 (DE) .......................... 102017001056.0

(51) Int. Cl.
*H01M 8/0612* (2016.01)
*H01M 8/0662* (2016.01)
(Continued)

(52) U.S. Cl.
CPC .......... *H01M 8/0612* (2013.01); *B64D 27/24* (2013.01); *B64D 31/00* (2013.01);
(Continued)

(58) Field of Classification Search
CPC ... H01M 8/04–04044; H01M 8/04082–04097; H01M 8/04291;
(Continued)

(56) References Cited

U.S. PATENT DOCUMENTS 5,141,824 A * 8/1992 Hirota ............... H01M 8/04753
429/415
5,149,600 A * 9/1992 Yamase .................... C01B 3/48
429/442
(Continued)

FOREIGN PATENT DOCUMENTS

DE   102004026226 A1   12/2005
DE   102005053692 B3    1/2007
(Continued)

OTHER PUBLICATIONS

Machine translation of Kumeta et al., JP 63-078455. Originally published Apr. 8, 1988 (Year: 1988).*

(Continued)

*Primary Examiner* — Jonathan Crepeau
*Assistant Examiner* — Jacob Buchanan
(74) *Attorney, Agent, or Firm* — Scully Scott Murphy and Presser

(57) ABSTRACT

A method for generating electrical energy by a fuel cell system operated with a reformate gas is provided. According to this method, a fuel cell system is provided. The fuel cell system has a first reactor and a second reactor. A gas separation unit is also provided. A portion of a first fuel gas is fed to the gas separation unit. A target gas including $N_2$ or $CO_2$ is separated by the gas separation unit. The separated target gas is fed into a protective housing of the fuel cell system. An $H_2$-enriched tail gas formed in the gas separation unit is fed as a second fuel gas for operation of the fuel cell.

27 Claims, 6 Drawing Sheets

Figure 1A:
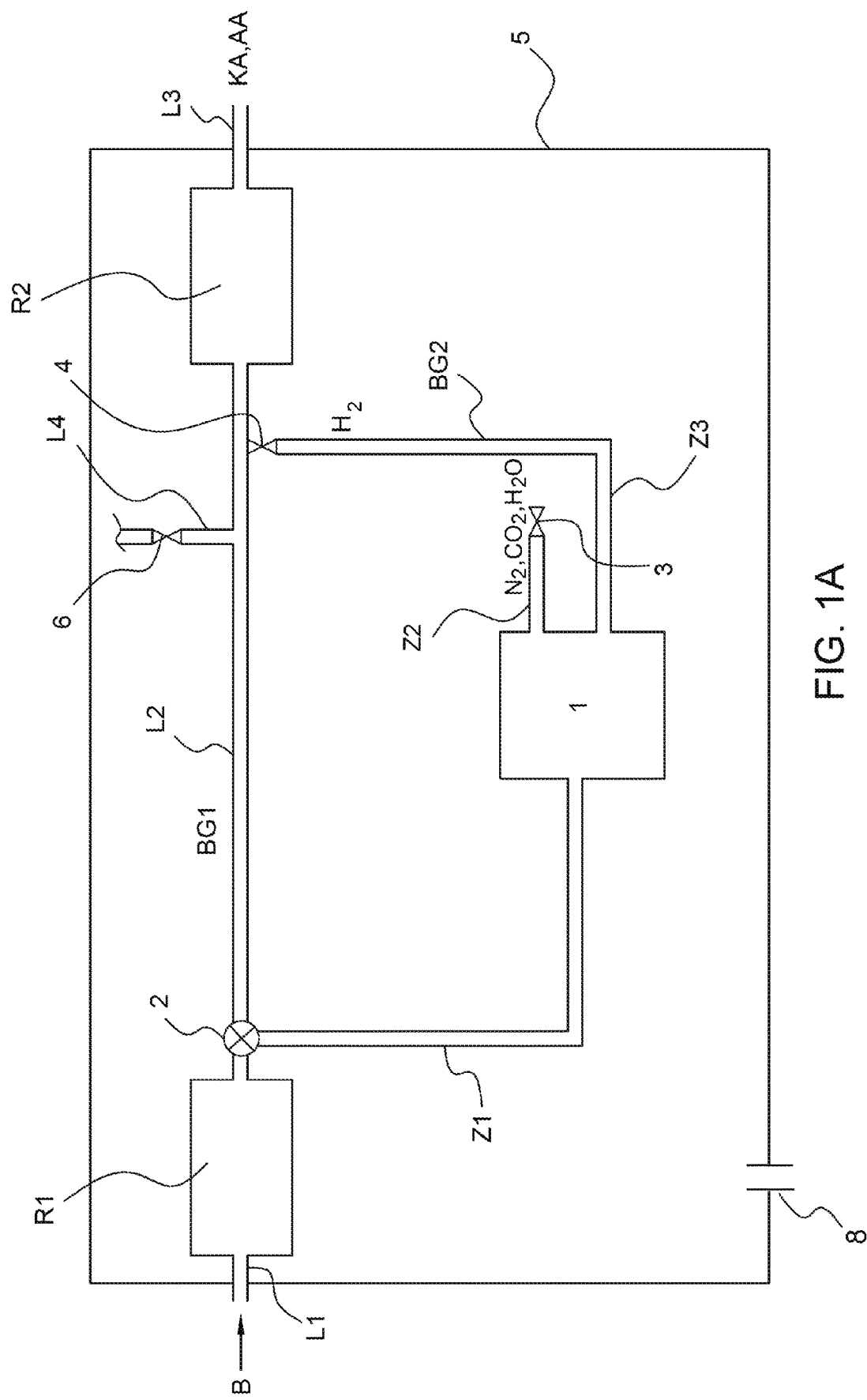

(51) Int. Cl.
*B64D 27/24* (2006.01)
*B64D 31/00* (2006.01)
*H01M 8/04119* (2016.01)

(52) U.S. Cl.
CPC ..... *H01M 8/04164* (2013.01); *H01M 8/0687* (2013.01); *H01M 2250/20* (2013.01)

(58) Field of Classification Search
CPC ......... H01M 8/06–0637; H01M 8/0662–0687; H01M 8/24–2404; B64D 27/02; B64D 27/24; B64D 33/00
See application file for complete search history.

(56) References Cited

U.S. PATENT DOCUMENTS

| | | | | |
|---|---|---|---|---|
| 7,537,738 | B2 * | 5/2009 | Brenner | B01D 53/22 422/108 |
| 10,112,718 | B2 | 10/2018 | Knepple et al. | |
| 2001/0018139 | A1 * | 8/2001 | Aoyama | H01M 8/0662 55/522 |
| 2002/0045078 | A1 * | 4/2002 | Kawasumi | H01M 8/04225 429/412 |
| 2003/0077492 | A1 * | 4/2003 | Kuriiwa | H01M 8/04089 429/411 |
| 2004/0043276 | A1 * | 3/2004 | Hoffjann | H01M 8/04089 429/411 |
| 2005/0008907 | A1 * | 1/2005 | Isozaki | H01M 8/0612 429/444 |
| 2006/0029849 | A1 * | 2/2006 | Metzler | H01M 8/04164 429/414 |
| 2007/0031707 | A1 * | 2/2007 | Kim | H01M 8/0668 429/444 |
| 2007/0111060 | A1 * | 5/2007 | Hoffjann | A62C 99/0018 429/414 |
| 2008/0187785 | A1 * | 8/2008 | Kwok | H01M 8/04208 244/10 |
| 2008/0292921 | A1 * | 11/2008 | Lakshmanan | H01M 8/04228 429/415 |
| 2009/0155642 | A1 | 6/2009 | Popham | |
| 2009/0169931 | A1 | 7/2009 | Qi | |
| 2010/0260657 | A1 * | 10/2010 | Niitsuma | C01B 3/48 423/437.1 |
| 2013/0200216 | A1 | 8/2013 | Mock et al. | |
| 2013/0206910 | A1 * | 8/2013 | Stolte | A62C 99/0018 244/129.2 |
| 2017/0309937 | A1 | 10/2017 | Boudjemaa | |

FOREIGN PATENT DOCUMENTS

| | | | |
|---|---|---|---|
| DE | 102012023531 A1 | 6/2014 | |
| EP | 0977293 A2 | 2/2000 | |
| EP | 1619738 A2 | 1/2006 | |
| FR | 3026233 A1 | 3/2016 | |
| GB | 2442309 A | 4/2008 | |
| JP | 63078455 A * | 4/1988 | ........ H01M 8/04223 |
| WO | WO 00/71644 A2 | 11/2000 | |

OTHER PUBLICATIONS

International Search Report dated Mar. 9, 2018 issued in PCT/EP2018/000023.

* cited by examiner

METHOD AND DEVICE FOR GENERATING ELECTRIC ENERGY

The invention relates to a method and to a device for generating electrical energy, especially for generating electrical energy for an aircraft.

DE 10 2004 026 226 A1 discloses an aircraft having an integrated electrochemical supply system. A first electrochemical reactor is provided here, which splits wastewater that arises within the aircraft, after purification or desalination, into the constituents hydrogen and oxygen. The hydrogen and the oxygen can be fed to a second reactor which is, for example, a fuel cell. By means of the fuel cell, electrical energy and water are produced from the hydrogen and the oxygen and hydrocarbonaceous energy carriers, for example kerosene. The first and second reactor are surrounded by a gastight protective housing filled with an inert gas.

DE 10 2005 053 692 B3 discloses a fuel cell for use in an aircraft. For fire protection, the fuel cell is accommodated in a protective housing filled with an inert gas. The inert gas used is nitrogen-enriched cathode offgas from the fuel cell. The inert gas formed from the cathode offgas disadvantageously has a relatively high content of residual oxygen.

US 2009/0155642 A1 discloses a reformate-operated fuel cell system. In this case, hydrogen is produced from a liquid fuel, for example methanol, in a first reactor in the form of a reformer, and is then supplied to a downstream fuel cell for generation of electrical energy. The first reactor may comprise a purification stage with which a proportion of extraneous gases in the hydrogen is produced.

DE 10 2012 023 531 A1 discloses a method of producing an operating medium on board an aircraft. In this case, a fuel cell unit having at least one fuel cell is accommodated in a first trolley. A second trolley accommodates a storage unit for uptake of hydrogen for operation of the fuel cell. The first trolley and the second trolley may be coupled to one another such that the fuel cell can be supplied with fuel. The fuel cell is accommodated in the first trolley in a protective housing filled with an inert gas. The inert gas is produced using cathode offgas and/or anode offgas.

Cathode offgas contains a relatively high content of residual oxygen of about 9%. Anode offgas can also be used as inert gas depending on the composition. As a result, using cathode offgas and/or anode offgas as inert gas, it is not possible to entirely rule out a risk of explosion in the event of escape of hydrogen from the fuel cell.

It is an object of the invention to eliminate the disadvantages according to the prior art. More particularly, a method improved in terms of safety for generation of electrical energy by means of a fuel cell system operated with reformate gas is to be specified. In a further aim of the invention, the efficiency of the method is to be improved. It is a further object of the present invention to specify a fuel cell system improved from a safety point of view. The fuel cell system is also to have improved efficiency with regard to the generation of electrical energy.

This object is achieved by the features of claims 1 and 17. Appropriate configurations of the invention are apparent from the features of claims 2 to 16 and 18 to 26.

According to the invention, a method of generating electrical energy by means of a fuel cell system operated with a reformate gas is proposed, having the following steps:
providing a fuel cell system having a first reactor for conversion of a fuel to a first fuel gas and a second reactor connected downstream of the first reactor, where the second reactor forms a fuel cell for generation of electrical energy with formation of a cathode offgas and an anode offgas, and where at least the second reactor is surrounded by a protective housing,
providing a gas separation unit with which at least one of the gases $CO_2$, $N_2$ and/or a partial gas mixture comprising $CO_2$ and $N_2$ is separable from the first fuel gas or a further gas mixture formed therefrom,
feeding at least a portion of the first fuel gas or of the further gas mixture formed therefrom to the gas separation unit,
separating the gases $N_2$ or $CO_2$ or the partial gas mixture from the first fuel gas or the further gas mixture,
feeding the gases $N_2$ or $CO_2$ separated or the partial gas mixture separated as inert gas into the protective housing and
feeding an $H_2$-enriched tail gas formed in the gas separation unit as second fuel gas for operation of the fuel cell or a further fuel cell.

In the context of the present invention, a "fuel" is any hydrocarbon of the general formula $C_xH_yO_z$ or a mixture of different hydrocarbons. The hydrocarbons may, for example, be kerosene, natural gas, alcohol, especially methanol, or the like.

A "reactor" in the context of the present invention is understood to mean a unit with which substances supplied, for example hydrocarbons, are converted to a further substance under the action of temperature and/or pressure and/or auxiliaries, such as catalysts. The substance may be a substance mixture, especially a liquid or gas mixture. For conversion of the substance in the reactor it is typically necessary to expend energy.

A "fuel gas" is understood to mean a gas or gas mixture suitable for operation of a fuel cell.

A "further gas mixture" is understood to mean a further fuel gas suitable for operation of a fuel cell, a cathode or anode offgas formed by the fuel cell or an offgas which is formed by an offgas cleaning stage downstream of the fuel cell.

The method of the invention relates to a fuel cell system operated with a reformate gas. This involves supplying a fuel to a first reactor in which the fuel is converted to a first fuel gas. For this purpose, the first reactor may comprise a conventional reformer. In the fuel cell system, following a main flow direction of the first fuel gas or of further gas mixtures formed therefrom, a second reactor is arranged downstream, which comprises a fuel cell surrounding by a protective housing. The second reactor may also comprise multiple fuel cells. Also provided is a gas separation unit with which especially the gases $CO_2$, $N_2$ and/or a partial gas mixture comprising $CO_2$ and $N_2$ are separable from the first fuel gas or a further gas mixture formed therefrom. In the method of the invention, at least a portion of the first fuel gas or of the further gas mixture formed therefrom is fed to the gas separation unit. The separately removed gases $N_2$ or $CO_2$ or the separately removed partial gas mixture are then used as inert gas for filling the protective housing. In particular $CO_2$, but also $N_2$, is of excellent suitability as inert gas. They feature improved inertizing action especially compared to conventionally used oxygen-depleted air (ODA).

It is thus particularly effectively possible to lower the risk of explosion in the event of a leak in the fuel cell. The removal of the gases $N_2$, $CO_2$ can have a positive effect on a subsequent reaction and/or reduce the gas flow in terms of mass. As a result, reactors provided downstream can have smaller dimensions or the pressure drops in downstream reactors can be reduced. As a result, it is possible to reduce energy to be expended for gas transport.

The remainder, or a portion of the remainder, of the fuel gas or further gas mixture supplied to the gas separation unit that remains in the gas separation unit, after removal of one of the gases $CO_2$, $N_2$ and/or a partial gas mixture containing $CO_2$ and $N_2$, is referred to as tail gas.

The tail gas constitutes a second combustion gas which is supplied to the fuel cell or a further fuel cell for operation. The tail gas or second fuel gas differs in its composition from the first fuel gas. The second fuel gas is enriched with $H_2$ or is formed by $H_2$.

In the gas separation unit, a tail gas having a reduced content of $N_2$ and/or $CO_2$ or enriched with $H_2$ or formed from $H_2$ is thus formed.

A "gas separation unit" is appropriately understood to mean a unit with which a gas mixture is separable without supply of thermal energy and/or an increase in pressure. It is possible to separate off $N_2$, for example, by the Linde method and to separate off $H_2$ by the use of palladium platelets. Also known is a separation of $H_2$, $N_2$ or $CO_2$ by means of films or by absorption. In addition, $CO_2$ can be separated off by adsorption, i.e. by binding to a solid. In mobile applications, for performance of the separation of the aforementioned gases, membrane methods in particular are used. In this case, a permeable membrane separates the gas stream into the constituents.

The term "main flow direction" is understood to mean the direct route, i.e. without branches and/or diversions, of the gas stream through the series-connected reactors.

In the method proposed, it is possible to feed merely a portion of the first fuel gas to the gas separation unit. In this case, the other portion of the first fuel gas that remains in the main flow is unchanged in its composition. Alternatively, it is possible to feed the first fuel gas entirely to the gas separation unit. In this case, by means of the gas separation unit, a further or second fuel gas that differs in its composition from the first fuel gas is produced. The further or second fuel gas especially has a reduced content of $N_2$ and/or $CO_2$. A reduction, especially in the $CO_2$ content in the main gas stream, can have a positive effect on reaction equilibria in downstream reactions, for example in the water-gas shift reactor.

The gas separation unit can also separate off $H_2$ separately as gas and it can be used as second fuel gas for operation of the fuel cell or a further fuel cell. This increases the efficiency of the method.

The $H_2$, in the case of splitting into two $H_2$ partial gas streams, can also be used to operate different fuel cell types. This enables a dissimilar redundant mode of operation which is especially advantageous in the case of use in aircraft. For example, in redundant operation, it is possible to operate a low-temperature polymer electrolyte membrane fuel cell (LTPEM) and a solid oxide fuel cell (SOFC).

The separation of $H_2$ from the main gas stream can also bring about a positive shift in the reaction equilibrium in the water-gas shift reaction. This can improve the efficiency of the method and the efficacy of generation of electrical energy.

In an advantageous configuration of the method, a proportion of CO in the first fuel gas is reduced by means of a third reactor designed as a water-gas shift stage and connected downstream of the first reactor and/or of a fourth reactor configured as a PrOx stage. The abbreviation "PrOx" stands for "preferential oxidation". This is a preferred oxidation of a usually gaseous substance over a catalyst. In the context of the present invention, this is especially the oxidation of CO over a catalyst to give $CO_2$. The use of the third and/or fourth reactor proposed is especially advantageous when fuel cell types having an efficiency reduced by a high content of CO in the flue gas are used. The provision of the third and/or fourth reactor is advantageous especially when the fuel cell used is a low-temperature polymer electrolyte membrane fuel cell (LTPEM) or a high-temperature polymer electrolyte membrane fuel cell (HTPEM).

In a further configuration of the process, it is also possible to feed the cathode offgas and/or anode offgas at least partly as further gas mixture to the gas separation unit. It is thus possible to separate a residue of $H_2$ from the anode offgas and reuse it as second fuel gas for operation of the fuel cell or a further fuel cell. In addition, especially the gases $N_2$ and/or $CO_2$ or a partial gas mixture containing $CO_2$ and $N_2$ can be obtained from the cathode and/or anode offgas and used as inert gas. Such an inert gas is particularly low in residual oxygen.

In a further configuration of the invention, a fifth reactor for conversion of the cathode offgas and/or anode offgas is connected downstream of the second reactor, in which case an offgas formed in the fifth reactor can be fed at least partly as further gas mixture to the gas separation unit. It is also especially possible to separate $CO_2$ as gas from the offgas and use it as inert gas.

The first fuel gas or the first gas mixture may contain gaseous $H_2O$. The gaseous $H_2O$ can be separated off by means of the gas separation unit and likewise used as inert gas or for production of moist, oxygen-depleted air (ODA). Inert gas admixed with gaseous $H_2O$ counteracts the spread of flames. Moist, oxygen-depleted air can be used, for example, in cargo holds of aircraft for inertization.

In a further configuration of the process, the gaseous $H_2O$ can be converted to liquid $H_2O$ and discharged for external use. "Discharge for external use" is understood to mean that a corresponding substance is conducted out of the method and used elsewhere. For example, the water produced can be sent to a water reservoir in an aircraft.

The first fuel gas or the first gas mixture may contain gaseous $H_2O$. The gaseous $H_2O$ can be converted by means of a condenser to liquid $H_2O$ and discharged for external use and/or sent to an internal use. The liquid $H_2O$ can also be separated off upstream of the gas separation unit.

Heat released in the conversion of gaseous $H_2O$ to liquid $H_2O$ can be discharged for external use. For example, the heat can be used via a heat exchanger for heating of drinking water or cabin air in an aircraft.

The first fuel gas and/or the further fuel gas are separated into the individual gases in the gas separation unit, preferably using membranes. Suitable membranes for separation of $CO_2$ are especially those made of polyethylene glycol, polyamide, polyimide and the like. Hollow fiber membranes are suitable for separation of $N_2$. $H_2$ can be removed, for example, by means of membranes produced from metal foils. Metal foils of this kind may have been produced from palladium, palladium alloys, refractory metals such as vanadium, niobium or tantalum, or alloys thereof.

The fuel used in the method of the invention may especially be hydrocarbon of the general formula $C_xH_yO_z$ or a mixture of different hydrocarbons, especially kerosene, natural gas, alcohol, preferably methanol. It is of course also possible to use either liquid or gaseous hydrocarbons.

In an advantageous configuration of the method, $CO_2$ and/or $N_2$ separated off by means of the gas separation unit can be discharged for external use, especially for inertization of a cargo hold and/or a tank hold in an aircraft. In addition, it is possible to use $CO_2$ and/or $N_2$ separated off by means of the gas separation unit, mixed with gaseous $H_2O$, as extinguishant for a cargo hold in an aircraft.

In a further configuration, it is possible to branch off a portion of the first fuel gas and discharge it for external use, especially for operation of a further fuel cell. It is also possible to discharge the anode offgas to external use for use as a further fuel gas.

In an advantageous configuration, not just the second reactor but multiple reactors, preferably all reactors, are surrounded by the protective housing. In addition, it is also possible for the gas separation unit, one or more conduits that connect the reactors to one another, feeds connected to the gas separation unit and/or control valves inserted into the conduits and feeds to be surrounded by the protective housing.

In a further provision of the invention, a fuel cell system is proposed, having
a first reactor for conversion of the fuel to a first fuel gas,
a second reactor connected downstream of the first reactor, wherein the second reactor forms a fuel cell for generation of electrical energy using a cathode offgas and an anode offgas, and wherein at least the second reactor is surrounded by a protective housing,
a gas separation unit with which at least one of the gases $CO_2$, $N_2$ and/or a partial gas mixture containing $CO_2$ and $N_2$ is separable from the first fuel gas or a further gas mixture formed therefrom,
a first feed unit for feeding at least a portion of the first fuel gas or the further gas mixture formed therefrom to the gas separation unit,
a second feed unit for feeding the gases $N_2$ or $CO_2$ separated off by means of the gas separation unit or the partial gas mixture separated off to the protective housing and
a third feed unit for feeding an $H_2$-enriched tail gas as second fuel gas to the second reactor or to a sixth reactor comprising a further fuel cell.

In the context of the invention, a "feed unit" is understood to mean a conduit connected to the gas separation unit. The feed unit may comprise one or more valves by which flow through the conduit can be enabled, shut off or controlled in terms of amount. The feed unit may also comprise at least one of the following sensors: temperature sensor, pressure sensor, mass flow sensor and the like. By means of parameters detected by the sensors, it is possible to control an amount of the first fuel gas or further gas mixture supplied to the gas separation unit through the conduit. Equally, it is possible to control an amount of separated gases produced by the gas separation unit of a partial gas mixture by open- or closed-loop control.

In the context of the invention, multiple first feed units may be provided to supply the first fuel gas or the further gas mixture formed therefrom to the gas separation unit. The first feed units here each branch off at different points in the main gas stream. For example, it is possible to provide a first feed unit downstream of each reactor. In a similar manner, it is also possible for multiple third feed units to be provided in order to enrich the main gas stream with hydrogen upstream of defined reactors. It is possible to provide a controller with which the feed devices are controllable in such a way that an inert gas of minimum oxygen content is produced and supplied to the protective housing. The control is appropriately configured so as also to improve the efficiency of the production of electrical energy by means of the at least one fuel cell.

In an advantageous configuration, the gas separation unit is also set up such that it can also be used to separate $H_2$ separately from the first fuel gas or the further gas mixture formed therefrom. $H_2$ can be supplied to the fuel cell and/or to a further fuel cell as fuel.

A third reactor in the form of a water-gas shift stage and/or a fourth reactor in the form of a PrOx stage may be connected downstream of the first reactor. In a further configuration, a fourth feed unit is provided for feeding at least a portion of the cathode offgas and/or anode offgas as further gas mixture to the gas separation unit. In addition, a fifth reactor for conversion of the cathode offgas and/or the anode offgas may be connected downstream of the second reactor. The provision of the fourth feed unit ensures that the gas separation unit is supplied at any time with a sufficient amount of gas mixtures, such that a sufficient amount of inert gas can be produced and supplied to the protective housing. This can also achieve the effect that hydrogen unutilized in the method is used as the second fuel and hence particularly efficient generation of electrical energy can be achieved.

In addition, a unit for conversion of gaseous $H_2O$ separated off by means of the gas separation unit to liquid $H_2O$ may be provided. This may be a condenser. The liquid $H_2O$ may be discharged for external use. For this purpose, a separate conduit may be provided.

In a further configuration, a condenser for separating off gaseous $H_2O$ present in the first fuel gas or in the further gas mixture is provided. Such a condenser may be connected upstream or else downstream of the gas separation unit.

In addition, a unit may be provided for discharge of heat released in the conversion of gaseous $H_2O$ to liquid $H_2O$. This may be a heat exchanger for example.

The gas separation unit is preferably a gas separation unit provided with specific membranes, with which the respective gases are separable from the first fuel gas or from the further gas mixture.

Advantageously, not just the second reactor but multiple reactors, preferably all reactors, are surrounded by the protective housing. In addition, the gas separation unit, one or more conduits that connect the reactors to one another, feeds connected to the gas separation unit and/or control valves inserted into the conduits and feeds may also be surrounded by the protective housing.

Figure 1B:
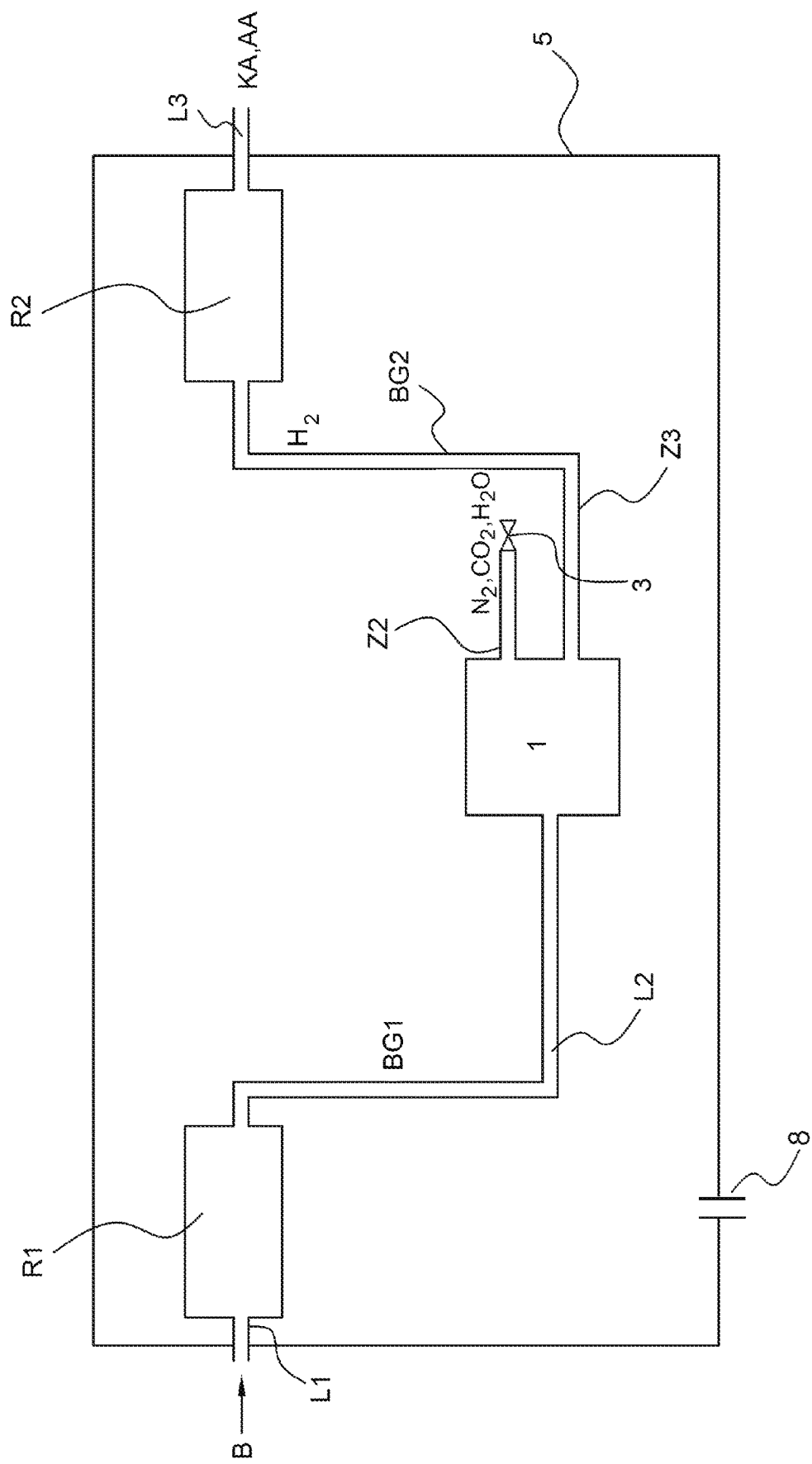
Figure 2:
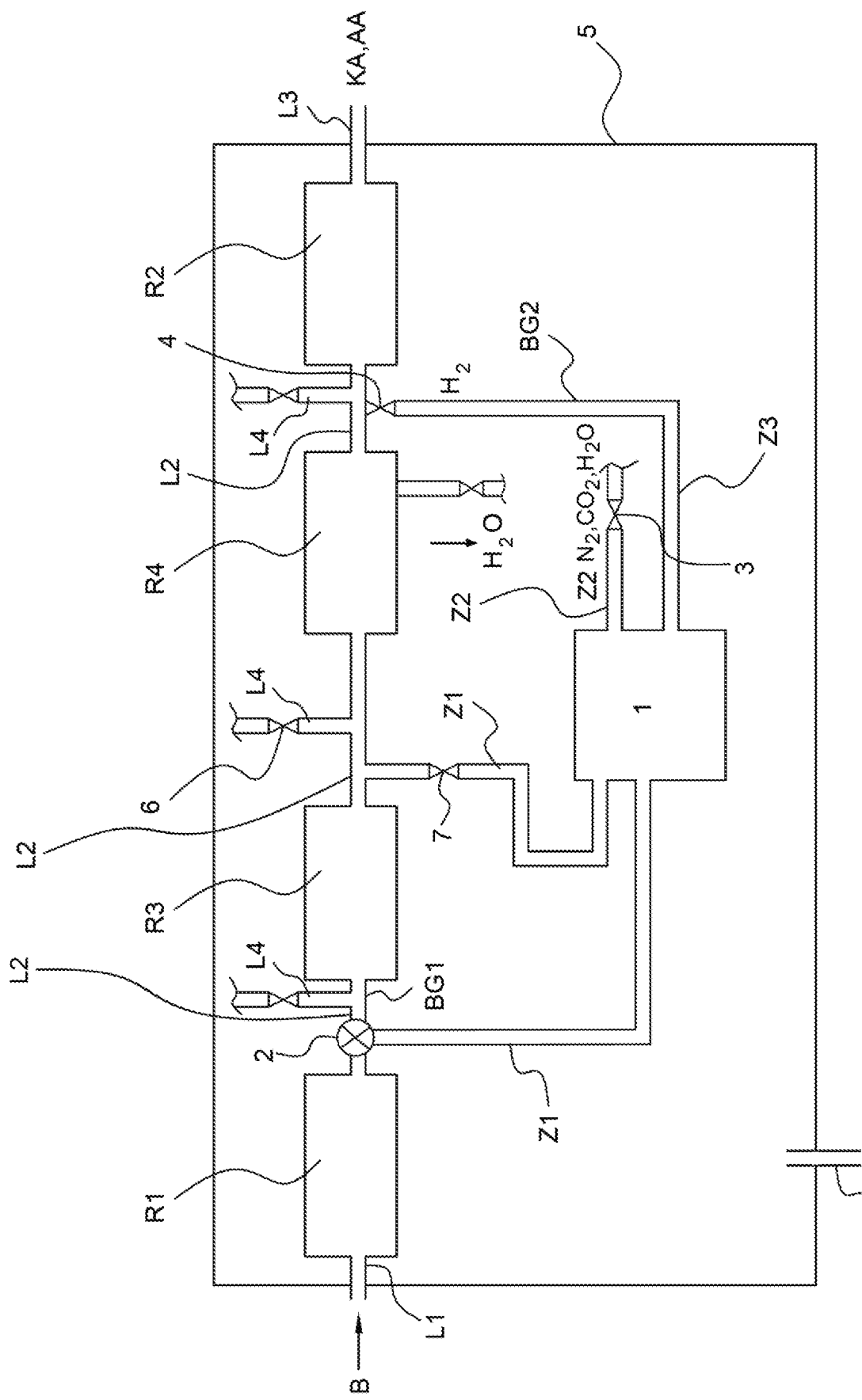
Figure 3:
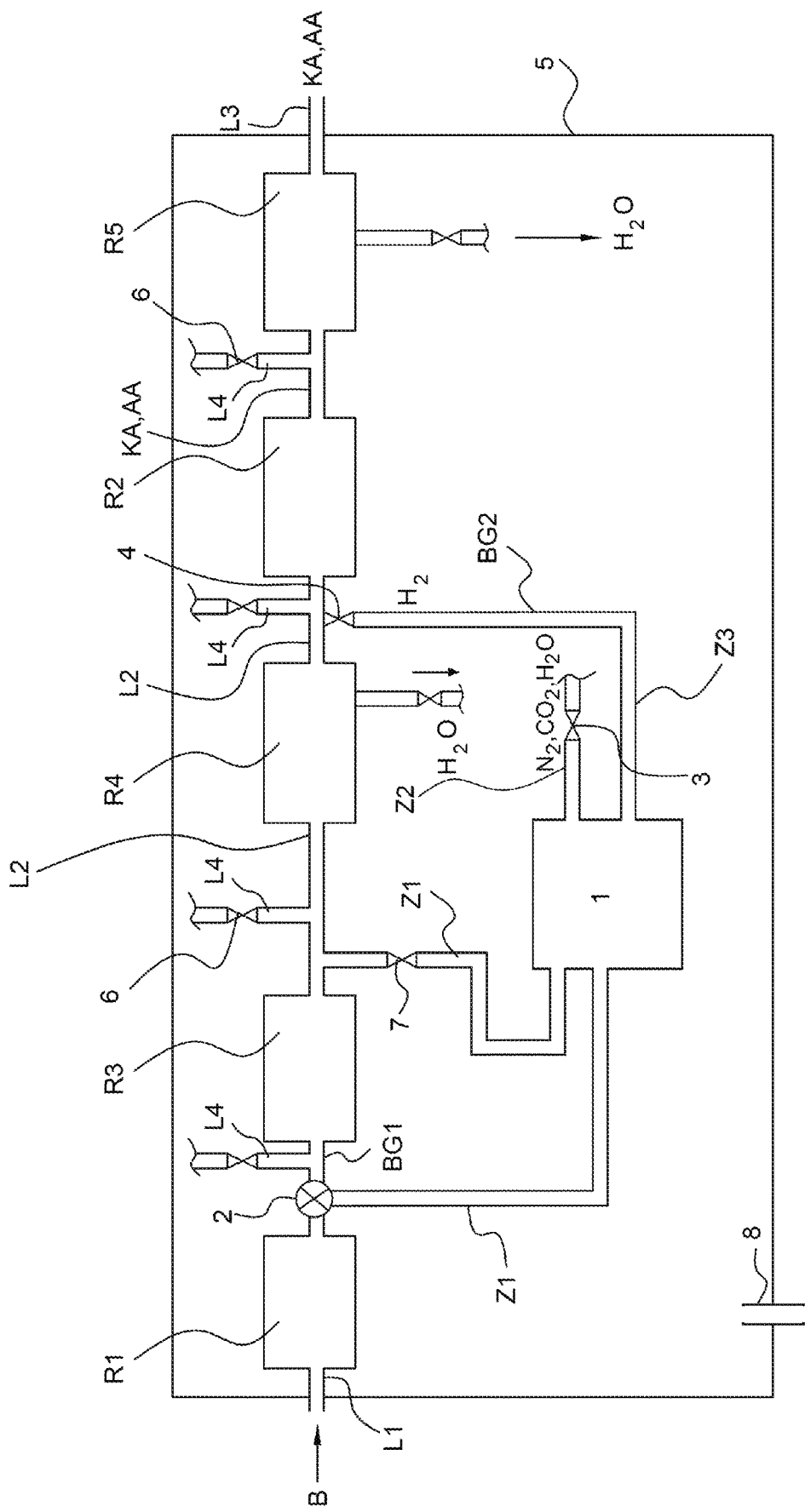
Figure 4:
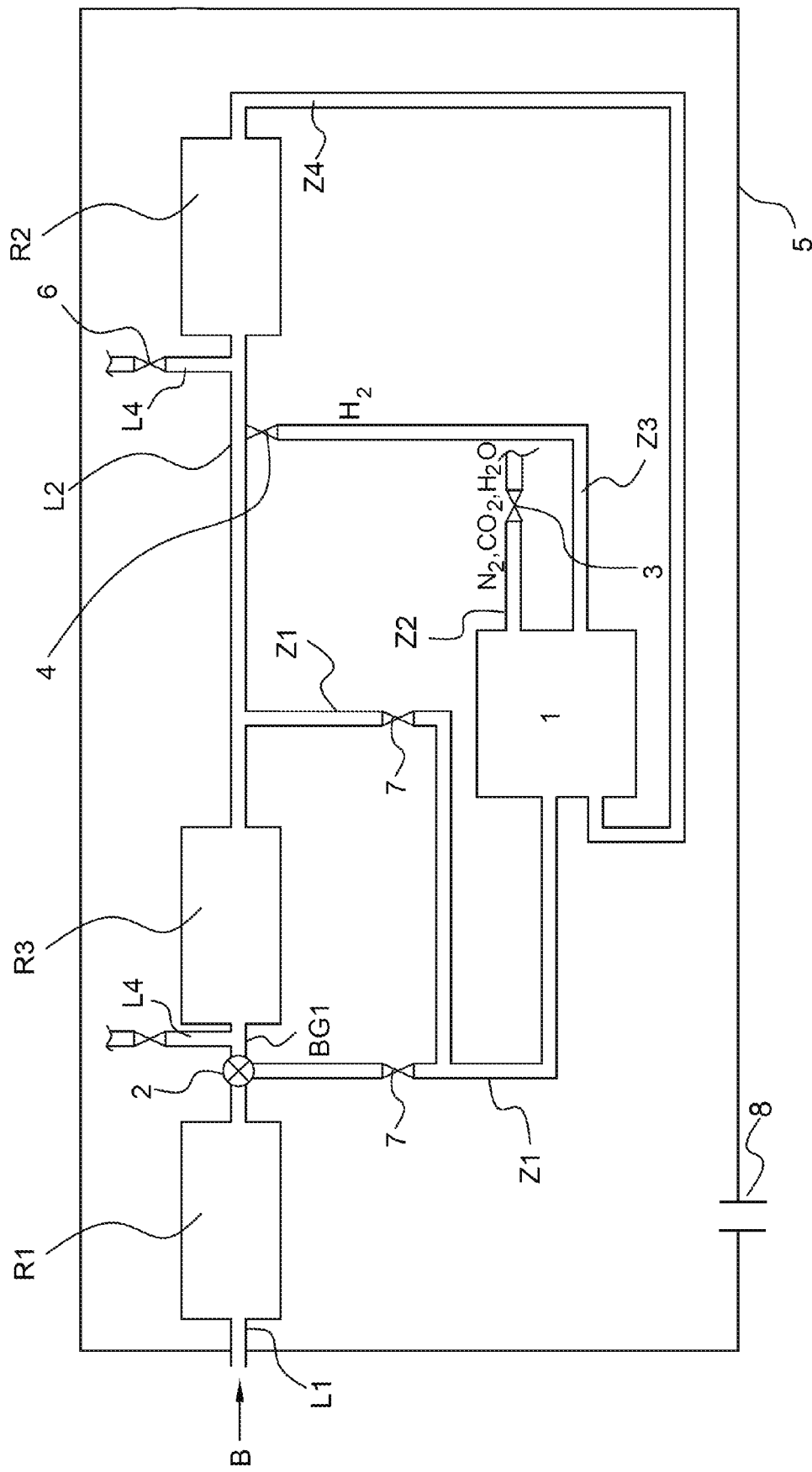
Figure 5:
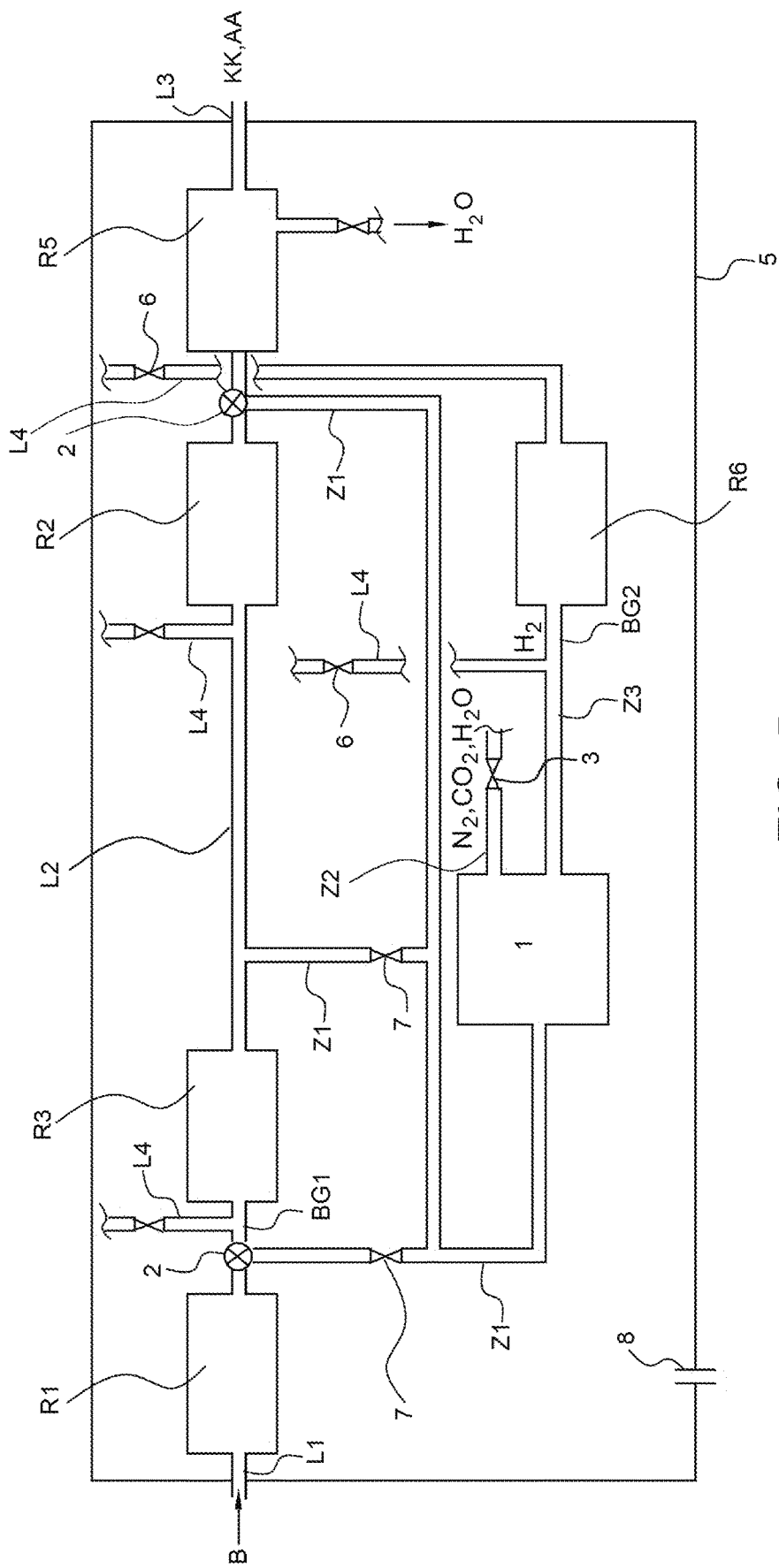

There follows a detailed elucidation of configurations of the invention with reference to the drawings. The drawings show:

FIG. 1A a first fuel cell system,
FIG. 1B a modification of the first fuel cell system according to FIG. 1A,
FIG. 2 a second fuel cell system,
FIG. 3 a third fuel cell system,
FIG. 4 a fourth fuel cell system and
FIG. 5 a fifth fuel cell system.

FIG. 1A shows a schematic view of a first fuel cell system. A first conduit L1 for supply of a fuel B opens into a first reactor R1. The fuel B may, for example, be methanol, kerosene or the like. The first reactor R1 comprises a reformer. It is connected at the outlet end via a second conduit L2 to a downstream second reactor R2. The second reactor R2 comprises at least one fuel cell, for example a solid oxide fuel cell, NTPEM, HTPEM or the like. A first feed Z1 branches off from the second conduit L2 and is connected to a gas separation unit 1. Reference numeral 2 denotes a first barrier or control valve with which an amount of a stream of a first fuel gas BG1 exiting from the first reactor R1 is controllable such that the stream can be fed partly or else entirely to the first feed Z1.

At the outlet end, a second feed Z2 for removal of $N_2$ and/or $CO_2$ and/or $H_2O$ extends from the gas separation unit 1. The second feed Z2 can be shut off by means of a second barrier or control valve 3. A third feed Z3 that extends from the gas separation unit 1 at the outlet end opens into the second conduit L2. The third feed Z3 can be shut off by means of a third barrier or control valve 4. Reference numeral 5 denotes a protective housing which surrounds the first reactor R1, the second reactor R2, the gas separation unit 1 and conduits L1, L2, L3 and feeds Z1, Z2, Z3 at least in sections here. It may of course also be the case that the protective housing 5 surrounds the second reactor R2 only. In that case, the second feed Z2 opens into the protective housing 5.

Cathode offgas KA and anode offgas AA exits from a third conduit L3 or conduits (not shown here) from the second reactor R2 at the outlet end.

Reference numeral L4 denotes a fourth conduit that opens into the second conduit L2 upstream of the second reactor R2. A fourth barrier or control valve 6 is inserted into the fourth conduit L4, with which a mass flow of a gas supplied by the fourth conduit L4 can be controlled by open- or closed-loop control. If air or oxygen, for example, is supplied through the fourth conduit L4, the fourth conduit L4 may also be connected directly to the respective reactor. According to the nature of the gas supplied to the fourth conduit L4, according to the desired reaction, the gas may be fed directly to the reactor or else fed into a feed conduit to the reactor.

Reference numeral 8 denotes an outlet that penetrates the housing 5. The outlet 8 may be provided with a valve for elective opening or closing. The valve provided in the outlet may also be controllable by means of the controller.

The function of the first fuel system is as follows:

A first reactor R1, in the form of a reformer here, is supplied via the first conduit L1 with fuel B, for example methanol. In the first reactor R1, the fuel B is converted to a gaseous first fuel gas BG1 and discharged at the outlet end via the second conduit L2.

At least a portion of the first fuel gas BG1 is branched off by means of the first control valve 2 and fed via the first feed Z1 to the gas separation unit 1. The first fuel gas BG1 especially contains $N_2$, $CO_2$, $H_2$ and further gases. By means of the gas separation unit 1 at least $N_2$ and/or $CO_2$ and/or $H_2O$ is separated from the first fuel gas BG1. The gases separated off or a partial gas mixture of $N_2$, $CO_2$ and $H_2O$ are then guided by means of the second feed Z2 into the protective housing 5. The protective housing 5 is thus flooded with an inert gas atmosphere. The tail gas formed or remaining in the gas separation unit 1, formed from $H_2$ or enriched with $H_2$, forms a second fuel gas BG2 which is fed via the third feed Z3 to the second reactor R2 at the inlet end. The second reactor R2 is one or more fuel cells.

The second fuel gas BG2 or a mixture of the first fuel gas BG1 and the second fuel gas BG2 is converted to electrical current in the second reactor R2. This forms a cathode offgas KA and an anode offgas AA that are removed by the third conduit L3 or third conduits L3 (not shown here).

FIG. 1B shows a simplified, modified configuration of the first fuel cell system according to FIG. 1A. The first feed Z1 is omitted here. The second conduit L2 opens into the gas separation unit 1. At the outlet end, the third feed Z3 extends directly from the gas separation unit 1 to the inlet of the second reactor R2. The second feed Z2 that extends from the outlet side of the gas separation unit 1 can be shut off with the second barrier or control valve 3.

In the modified configuration of FIG. 1B, the first fuel gas BG1 produced by the first reactor R1 is fed via the second conduit L2 to the gas separation unit 1. By means of the gas separation unit 1, at least $N_2$ and/or $CO_2$ and/or $H_2O$ is separated from the first fuel gas BG1. The gases separated off are then—as in the case of the first fuel cell system according to FIG. 1A—guided into the protective housing 5. The tail gas enriched with $H_2$ which is formed or remaining in the gas separation unit 1 forms the second fuel gas BG2, which is fed via the third feed Z3 to the second reactor R2 at the inlet end.

FIG. 2 shows a second configuration of the fuel cell system of the invention. In this case, a third reactor R3 is provided downstream of the first reactor R1 and, downstream of the third reactor R3, a fourth reactor R4 with the second reactor R2 downstream thereof.

The third reactor R3 is a water-gas shift stage and the fourth reactor R4 is a PrOx stage. Both the third reactor R3 and the fourth reactor R4 are used to remove CO from the first fuel gas BG1 or a further gas mixture formed therefrom. Between the reactors, via fourth conduits L4 that may open into the second conduit L2, further hydrocarbons, air or other substances may electively be supplied to the stream of the first fuel gas BG1 or the further gas mixture, such that it is electively possible to influence the molar proportions between the reactors. If exclusively air is fed in via the fourth conduit L4, this may also be connected directly to the reactor that falls downstream. In other words, in this case, the fourth conduit L4 need not necessarily open into the feed to the downstream reactor.

At the inlet of the fourth reactor R4, it is possible to supply air for example. At the inlet of the second reactor R2, it is likewise possible to supply air. Downstream of the third reactor R3, a further first feed Z1 is provided, with which a further gas mixture exiting from the third reactor R3 can be supplied to the gas separation unit 1. Reference numeral 7 denotes a fifth barrier or control valve with which a gas stream through the further first conduit Z1 can be enabled, shut off or controlled in terms of amount.

In the first fuel cell system shown in FIG. 3, a fifth reactor R5 is connected downstream of the second reactor R2. The offgas from the fifth reactor R5 may—given suitable gas supply via the fourth conduit L4 connected directly upstream of the fifth reactor R5—be or become an inert gas which can be introduced into the protective housing 5 or discharged from the process and used elsewhere. The fifth reactor R5 may comprise a condenser. It is thus possible to separate water vapor from the offgas and provide it as liquid water for in-process use, for example in the reactor R1. The water can also be discharged from the process and used elsewhere. The fourth reactor R4 may also comprise a condenser for removal of water in order to remove water upstream of the second reactor R2.

FIG. 4 shows a fourth fuel cell system. In this case, a fourth feed Z4 is provided at the outlet end of the second reactor R2, with which cathode offgas KA and/or anode offgas AA exiting from the second reactor R2 is supplied to the gas separation unit 1. It is thus possible to separate residual hydrogen from the cathode offgas KA and/or anode offgas AA and supply it again via the third feed Z3 to the second reactor R2.

In the fifth fuel cell system shown in FIG. 5, the second fuel gas BG2 separated off with the gas separation unit 1, hydrogen in this case, is fed via the third feed Z3 to a sixth reactor R6. This may be a further fuel cell, for example an LTPEM. In this case, the second reactor R2 preferably comprises an HTPEM as fuel cell.

The gas separation unit 1 is additionally connected by means of further first feeds Z1 that branch off downstream of the third reactor R3 and the second reactor R2. It is thus possible to branch off first fuel gas BG1 and/or further gas mixture at any points from the second conduit L2 or the main stream and feed them to the gas separation unit 1.

A sixth reactor R6 is inserted into the third feed Z3. The sixth reactor R6 may comprise an LTPEM as fuel cell. At the outlet end, the sixth reactor R6 has a fourth conduit L4 with a fourth barrier or control valve 6, with which a mass flow of a gas supplied through the fourth conduit L4 can be controlled under open- or closed-loop control.

A further fourth conduit L4 can branch off from the third conduit Z3 a further fourth conduit L4 with a barrier or control valve 6.

In a modification of the fifth fuel cell system, the third reactor R3 can also be omitted. In this case, the second reactor R2 comprises an SOFC as fuel cell. The sixth reactor R6 comprises an LTPEM as fuel cell.

A portion of the hydrogen that forms the second fuel gas BG2 may also be discharged from the process and used elsewhere. With the gas separation unit 1 it is also possible to feed external loads outside the fuel cell system.

Although it is not shown in the figures, it may also be the case that the protective housing 5 surrounds only those reactors that comprise fuel cells.

The fuel cell system proposed is especially suitable for use in a vehicle, especially an aircraft. The invention also relates to an aircraft comprising the fuel cell system described above.

LIST OF REFERENCE NUMERALS 1 gas separation unit
2 first control valve
3 second control valve
4 third control valve
5 protective housing
6 fourth control valve
7 fifth control valve
AA anode offgas
B fuel
BG1 first fuel gas
BG2 second fuel gas
KA cathode offgas
L1 first conduit
L2 second conduit
L3 third conduit
L4 fourth conduit
R1 first reactor
R2 second reactor
R3 third reactor
R4 fourth reactor
R5 fifth reactor
R6 sixth reactor
Z1 first feed
Z2 second feed
Z3 third feed
Z4 fourth feed

The invention claimed is:

1. A method of generating electrical energy through a fuel cell system operated with a reformate gas, comprising:
providing a fuel cell system having a first reactor for conversion of a fuel to a first fuel gas and a second reactor connected downstream of the first reactor, wherein the second reactor forms a fuel cell for generation of electrical energy with formation of a cathode offgas and an anode offgas, and wherein at least the second reactor is surrounded by a protective housing,
providing a gas separation unit, wherein the gas separation unit is configured to separate a target gas from the first fuel gas or a further gas mixture formed from the first fuel gas, wherein the target gas comprises at least one of $CO_2$, $N_2$ and a partial gas mixture comprising $CO_2$ and $N_2$,
feeding a portion of the first fuel gas or the further gas mixture to the gas separation unit, wherein the remaining portion of the first fuel gas or further gas mixture is led to the second reactor,
separating the target gas from the first fuel gas or the further gas mixture,
feeding the separated target gas as an inert gas into the protective housing, and
feeding an $H_2$-enriched tail gas formed in the gas separation unit as a second fuel gas to the fuel cell.

2. The method as claimed in claim 1, wherein the gas separated off by the gas separation unit comprises $H_2$ and is used as the second fuel gas for operation of the fuel cell or the further fuel cell.

3. The method as claimed in claim 1, wherein a proportion of CO in the first fuel gas is reduced by a third reactor designed as a water-gas shift stage and connected downstream of the first reactor and/or of a fourth reactor configured as a PrOx stage.

4. The method as claimed in claim 1, wherein at least one of the cathode offgas and anode offgas is supplied at least partly as another further gas mixture to the gas separation unit.

5. The method as claimed in claim 1, wherein a fifth reactor for conversion of the cathode offgas and/or anode offgas is connected downstream of the second reactor, and wherein an offgas formed in the fifth reactor is used as another inert gas and/or supplied as another further gas mixture to the gas separation unit.

6. The method as claimed in claim 1, wherein the first fuel gas or the further gas mixture comprises gaseous $H_2O$ separatable by the gas separation unit, and wherein the separated gaseous $H_2O$ is used as another inert gas.

7. The method as claimed in claim 6, wherein the gaseous $H_2O$ is converted to liquid $H_2O$ and discharged for external and/or internal use.

8. The method as claimed in claim 1, wherein the first fuel gas or the further gas mixture comprises gaseous $H_2O$, and wherein the gaseous $H_2O$ is converted by a condenser to liquid $H_2O$ and discharged for external and/or internal use.

9. The method as claimed in claim 8, wherein heat released in the conversion of the gaseous $H_2O$ to the liquid $H_2O$ is discharged for external use.

10. The method as claimed in claim 1, wherein the first fuel gas or the further gas mixture is separated in the gas separation unit using membranes.

11. The method as claimed in claim 1, wherein the fuel used is a hydrocarbon of the general formula $C_xH_yO_z$ or a mixture of different hydrocarbons, including kerosene, natural gas and alcohol.

12. The method as claimed in claim 1, wherein $CO_2$ and/or $N_2$ separated off by the gas separation unit is discharged for external use, including for inertization of a cargo hold and/or a tank hold in an aircraft.

13. The method as claimed in claim 1, wherein $CO_2$ and/or $N_2$ separated off by the gas separation unit is used mixed with gaseous $H_2O$ as extinguishant for a cargo hold in an aircraft.

14. The method as claimed in claim 1, wherein a portion of the first fuel gas is branched off and discharged for external use, said external use including for operation of the further fuel cell or another fuel cell.

15. The method as claimed in claim 1, wherein the anode offgas is discharged for use as a further fuel gas for external use.

16. The method as claimed in claim 1, wherein all reactors, the gas separation unit, one or more conduits that connect the reactors to one another, feeds connected to the gas separation unit and/or control valves inserted into the conduits and feeds are surrounded by the protective housing.

17. The method as claimed in claim 11, wherein said alcohol is methanol.

18. A fuel cell system comprising:
a first reactor for conversion of a fuel to a first fuel gas,
a second reactor connected downstream of the first reactor, wherein the second reactor forms a fuel cell for generation of electrical energy using a cathode offgas and an anode offgas,
and wherein at least the second reactor is surrounded by a protective housing,
a gas separation unit configured to separate a target gas from the first fuel gas or a further gas mixture formed, wherein the target gas comprises at least one of $CO_2$, $N_2$ and a partial gas mixture comprising $CO_2$ and $N_2$,
a first feed unit for feeding a portion of the first fuel gas or the further gas mixture to the gas separation unit, wherein the remaining portion of the first fuel gas or further gas mixture is led to the second reactor,
a second feed unit for feeding the target gas separated by the gas separation unit as an inert gas into the protective housing, and
a third feed unit for feeding an $H_2$-enriched tail gas formed in the gas separation unit as a second fuel gas to the second reactor or to a sixth reactor comprising a further fuel cell.

19. The fuel cell system as claimed in claim 18, wherein the gas separation unit is configured to separate $H_2$ from the first fuel gas or the further gas mixture.

20. The fuel cell system as claimed in claim 18, wherein at least one of a third reactor in the form of a water-gas shift stage and a fourth reactor in the form of a PrOx stage is connected downstream of the first reactor.

21. The fuel cell system as claimed in claim 18, wherein a fourth feed unit is provided for feeding at least a portion of the cathode offgas and/or the anode offgas as another further gas mixture to the gas separation unit.

22. The fuel cell system as claimed in claim 18, wherein a fifth reactor for conversion of the cathode offgas and/or anode offgas is connected downstream of the second reactor.

23. The fuel cell system as claimed in claim 18, wherein a unit for conversion of gaseous $H_2O$ separated off by the gas separation unit to liquid $H_2O$ is provided.

24. The fuel cell system as claimed in claim 23, wherein a unit for discharge of heat released in the conversion of gaseous $H_2O$ to liquid $H_2O$ is provided.

25. The fuel cell system as claimed in claim 18, wherein a condenser for separating gaseous $H_2O$ present in the first fuel gas or in the further gas mixture is provided.

26. The fuel cell system as claimed in claim 18, wherein the gas separation unit comprises at least one membrane for separation of the gases present in the first fuel gas or in the further gas mixture.

27. The fuel cell system as claimed in claim 18, wherein all reactors, the gas separation unit, one or more conduits that connect the reactors to one another, feeds connected to the gas separation unit and/or control valves inserted into the conduits and feeds are surrounded by the protective housing.

* * * * *